(12) United States Patent
Mihan et al.

(10) Patent No.: US 11,518,824 B2
(45) Date of Patent: Dec. 6, 2022

(54) SUPPORTED CATALYST SYSTEM

(71) Applicants: BASELL POLYOLEFINE GMBH, Wesseling (DE); ALBERT-LUDWIGS-UNIVERSITAT FREIBURG, Freiburg (DE)

(72) Inventors: Shahram Mihan, Bad Soden (DE); Heike Gregorius, Koblenz (DE); Volker Fraaije, Frankfurt am Main (DE); Rolf Mulhaupt, Freiburg (DE); Fan Zhong, Freiburg (DE)

(73) Assignees: Basell Polyolefine GmbH, Wesseling (DE); Albert-Ludwias-Universität Freiburo, Freiburg (DE)

( * ) Notice: Subject to any disclaimer, the term of this patent is extended or adjusted under 35 U.S.C. 154(b) by 379 days.

(21) Appl. No.: 16/755,503

(22) PCT Filed: Oct. 5, 2018

(86) PCT No.: PCT/EP2018/077075
§ 371 (c)(1),
(2) Date: Apr. 10, 2020

(87) PCT Pub. No.: WO2019/072695
PCT Pub. Date: Apr. 18, 2019

(65) Prior Publication Data
US 2021/0221923 A1 Jul. 22, 2021

(30) Foreign Application Priority Data
Oct. 11, 2017 (EP) .................................... 17195969

(51) Int. Cl.
*C08F 4/02* (2006.01)
*C08F 4/6592* (2006.01)
*B01J 21/02* (2006.01)
*C08F 4/52* (2006.01)
*B01J 31/16* (2006.01)
*B82Y 30/00* (2011.01)
*B82Y 40/00* (2011.01)

(52) U.S. Cl.
CPC ................. *C08F 4/02* (2013.01); *B01J 21/02* (2013.01); *B01J 31/16* (2013.01); *C08F 4/52* (2013.01); *B82Y 30/00* (2013.01); *B82Y 40/00* (2013.01)

(58) Field of Classification Search
CPC .................................. C08F 4/02; C08F 4/6592
See application file for complete search history.

(56) References Cited

U.S. PATENT DOCUMENTS

| | | | |
|---|---|---|---|
| 2012/0006686 A1* | 1/2012 | Furman | C09D 7/68 205/109 |
| 2014/0193590 A1* | 7/2014 | Sue | C08J 7/06 427/427 |
| 2014/0256878 A1 | 9/2014 | Yoshiwara | |
| 2017/0210863 A1 | 7/2017 | Nishiguchi et al. | |

FOREIGN PATENT DOCUMENTS

| GB | 2099000 A | 12/1982 |
|---|---|---|
| JP | S6268803 A | 3/1987 |
| JP | H09324008 A | 12/1997 |

OTHER PUBLICATIONS

International Search Report and Written Opinion dated Feb. 5, 2019 (dated Feb. 5, 2019) for Corresponding PCT/EP2018/077075.

* cited by examiner

*Primary Examiner* — Caixia Lu

(57) ABSTRACT

A nano platelet gibbsite treated with compound of formula $(OR^a)_3Si$—$R^b$ or of formula $R^c$—COOH wherein $R^a$ equal to or different from each other is a $C_1$-$C_{10}$ alkyl radical; $R^b$ is a $C_5$-$C_{30}$ hydrocarbon radical and $R^c$ is a $C_5$-$C_{30}$ hydrocarbon radical is used as a catalyst support.

14 Claims, No Drawings

SUPPORTED CATALYST SYSTEM

This application is the U.S. National Phase of PCT International Application PCT/EP2018/077075, filed Oct. 5, 2018, claiming benefit of priority to European Patent Application No. 17195969.5, filed Oct. 11, 2017, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a supported catalyst system made from or containing a modified gibbsite as a support and a single site catalyst component.

BACKGROUND OF THE INVENTION

In some instances, gibbsite nano platelet ($\gamma$-Al(OH)$_3$) is synthesized from Al(NO$_3$)$_3$.9H$_2$O as precursor after hydrothermal crystallization.

SUMMARY OF THE INVENTION

In a general embodiments, the present disclosure provides a nano platelet gibbsite treated with compound of formula (OR$^a$)$_3$Si—R$^b$ or of formula R$^c$—COOH wherein R$^a$ equal to or different from each other is a C$_1$-C$_{10}$ alkyl radical; R$^b$ is a C$_5$-C$_{30}$ hydrocarbon radical and R$^c$ is a C$_5$-C$_{30}$ hydrocarbon radical.

In some embodiments, the present disclosure provides a supported catalyst system made from or containing:
A) at least one organometallic coordination compound consisting of a metal bonded to one or two cyclopentadienyl rings;
B) a nano platelet gibbsite treated with compound of formula (OR$^a$)$_3$Si—R$^b$ or of formula R$^c$—COOH wherein R$^a$ equal to or different from each other is a C$_1$-C$_{10}$ alkyl radical; R$^b$ is a C$_5$-C$_{30}$ hydrocarbon radical and R$^c$ is a C$_5$-C$_{30}$ hydrocarbon radical; and
C) a cocatalyst. In some embodiments, the cyclopentadienyl rings are substituted.

DETAILED DESCRIPTION OF THE INVENTION

In some embodiments, gibbsite nano platelet ($\gamma$-Al(OH)$_3$) is synthesized from Al(NO$_3$)$_3$.9H$_2$O as precursor after hydrothermal crystallization.

In some embodiments, gibbsite is characterized with different methods. The morphology of gibbsite is characterized with SEM and TEM. In some embodiments, gibbsite shows pseudo hexagonal structure with a length of 700 nm, thickness of 30 nm. The thermal gravity analysis on gibbsite indicates that gibbsite shows a thermal stability until 260° C. and decomposes at temperatures higher than 260° C. with loss of water. The residual mass of gibbsite at 650° C. is 66.44% and matches the theoretical value. Infrared (IR) characterization shows sharp peaks around 3500 cm$^{-1}$, indicating free stretch —OH group.

Gibbsite nano platelet is further treated with compound of formula (OR$^a$)$_3$Si—R$^b$ or of formula R$^c$—COOH wherein R$^a$ is a C$_1$-C$_{10}$ alkyl radical; R$^b$ is a C$_5$-C$_{30}$ hydrocarbon radical and R$^c$ is a C$_5$-C$_{30}$ hydrocarbon radical, thereby yielding component B) of the catalyst system of the present disclosure. Without being bound to any theory, it is believed that the compounds of formula (OR$^a$)$_3$Si—R$^b$ or formula R$^b$—COOH react with at least some of the OH group present on the surface of the gibbsite nano platelet to form an organophilic-modified gibbsite nano platelet. In some embodiments, the difference between the gibbsite nano platelet and the organophilic-modified gibbsite nano platelet is seen by suspending the two materials in toluene and then treating the suspension with an ultrasonic bath. The organophilic-modified gibbsite nano platelet is dispersed uniformly and does not settle. The gibbsite nano platelet forms a sediment immediately after the ultrasonic bath is switched off.

In the compound of formula (OR$^a$)$_3$Si—R$^b$, R$^a$ is a C$_1$-C$_{10}$ alkyl radical; R$^b$ is a C$_5$-C$_{30}$ hydrocarbon radical; alternatively R$^a$ is a C$_1$-C$_8$ alkyl radical; alternatively R$^a$ is a C$_1$-C$_4$ alkyl radical. In some embodiments, R$^a$ is a C$_1$-C$_4$ alkyl radical selected from the group consisting of methyl, ethyl isopropyl n-propyl, tertbutyl, and n-butyl, sec butyl. In some embodiments, R$^b$ is a linear or branched C$_5$-C$_{30}$, alkyl, alkenyl, or alkynyl radical, alternatively R$^b$ is a C$_{10}$-C$_{20}$ linear or branched C$_5$-C$_{30}$, alkyl, alkenyl, or alkynyl radical, alternatively R$^b$ is a C$_{10}$-C$_{20}$ linear alkyl, alkenyl, or alkynyl radical. In some embodiments, the compound of formula (OR$^a$)$_3$Si—R$^b$ is trimethoxy (octadecyl) silane.

In the compound of formula R$^c$—COOH, R$^c$ is a C$_5$-C$_{30}$ hydrocarbon radical; alternatively R$^c$ is a linear or branched C$_5$-C$_{30}$, alkyl, alkenyl, or alkynyl radical, alternatively R$^c$ is a C$_{10}$-C$_{20}$ linear or branched C$_5$-C$_{30}$, alkyl, alkenyl, or alkynyl radical, alternatively R$^c$ is a C$_{10}$-C$_{20}$ linear alkyl, alkenyl, or alkynyl radical, such as fatty acids. In some embodiments, the fatty acid is stearic acid.

As used herein, the term "organometallic coordination compounds" refers to compounds wherein a central transition metal atom is coordinated with one or more organic compound and optionally one or more inorganic anions such as chloride or bromide. In some embodiments, the organometallic coordination compounds is selected from the group consisting of metallocene, chromocene, and late transition metal complexes of nickel and iron.

Metallocene compounds are organometallic coordination compound consisting of a metal bonded to one or two cyclopentadienyl rings. In some embodiments, the cyclopentadienyl rings are substituted.

In some embodiments, the metallocene compounds have the following formulas (I), (II) or (III)

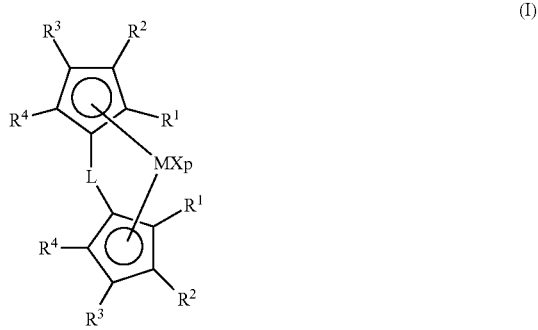

(I)

-continued

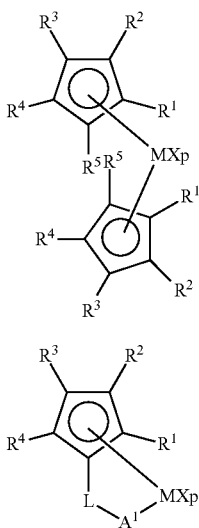

wherein
M is a transition metal belonging to group 4, 5 or to the lanthanide or actinide groups of the Periodic Table of the Elements; alternatively M is zirconium, titanium or hafnium;

the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl group, optionally containing one or more Si or Ge atoms. In some embodiments, the substituents X are the same. In some embodiments, the substituents X are $R^6$, $OR^6$ and $NR^6_2$. In some embodiments, $R^6$ is a $C_1$-$C_7$ alkyl, $C_6$-$C_{14}$ aryl or $C_7$-$C_{14}$ arylalkyl group, optionally containing one or more Si or Ge atoms. In some embodiments, the substituents X are selected from the group consisting of —Cl, —Br, -Me, -Et, -n-Bu, -sec-Bu, -Ph, -Bz, —CH$_2$SiMe$_3$, -OEt, -OPr, -OBu, -OBz and -NMe$_2$. In some embodiments, X is Cl or Me.

p is an integer equal to the oxidation state of the metal M minus 2;

L is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or $C_7$-$C_{20}$ arylalkylidene radicals optionally containing heteroatoms belonging to groups 13-17 of the Periodic Table of the Elements, and silylidene radical containing up to 5 silicon atoms such as SiMe$_2$, SiPh$_2$. In some embodiments, L is a divalent group $(ZR^7_m)_n$; Z being C, Si, Ge, N or P, and the $R^7$ groups, equal to or different from each other, being hydrogen or linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl groups. In some embodiments, two $R^1$ form a aliphatic or aromatic $C_4$-$C_7$ ring.

m is 1 when Z is N or P or m is 2 when Z is C, Si or Ge;
n is an integer ranging from 1 to 4;

In some embodiments, L is selected from the group consisting of Si(CH$_3$)$_2$, SiPh$_2$, SiPhMe, SiMe(SiMe$_3$), CH$_2$, (CH$_2$)$_2$, (CH$_2$)$_3$ and C(CH$_3$)$_2$;

$R^1$, $R^2$, $R^3$, $R^4$ and $R^5$, equal to or different from each other, are hydrogen atoms, or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radicals, optionally containing one or more heteroatoms belonging to groups 13-17 of the Periodic Table of the Elements; or two adjacent $R^1$, $R^2$, $R^3$, $R^4$ and $R^5$ form one or more 3-7 membered ring optional containing heteroatoms belonging to groups 13-17 of the Periodic Table; such as to form with the cyclopentadienyl moiety the following radicals: indenyl; mono-, di-, tri- and tetra-methyl indenyl; 2-methyl indenyl, 3-tertbutyl-indenyl, 2-isopropyl-4-phenyl indenyl, 2-methyl-4-phenyl indenyl, 2-methyl-4,5 benzo indenyl; 3-trimethylsilyl-indenyl; 4,5,6,7-tetrahydroindenyl; fluorenyl; 5,10-dihydroindeno[1,2-b]indol-10-yl; N-methyl- or N-phenyl-5,10-dihydroindeno [1,2-b]indol-10-yl; 5,6-dihydroindeno[2,1-b]indol-6-yl; N-methyl- or N-phenyl-5,6-dihydroindeno[2,1-b]indol-6-yl; azapentalene-4-yl; thiapentalene-4-yl; azapentalene-6-yl; thiapentalene-6-yl; mono-, di- and tri-methyl-azapentalene-4-yl, 2,5-dimethyl-cyclopenta[1,2-b:4,3-b']-dithiophene.

$A^1$ is a $NR^8$ group or an oxygen or sulfur atom, wherein the group $R^8$ is linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals, optionally containing heteroatoms belonging to groups 13 or 15-17 of the Periodic Table of the Elements; alternatively A is a NR8 group wherein $R^8$ is selected from the group consisting of methyl, ethyl, n-propyl, isopropyl, n-butyl, t-butyl, phenyl, p-n-butyl-phenyl, benzyl, cyclohexyl and cyclododecyl; alternatively $R^8$ is t-butyl.

In some embodiments, the metallocene complexes belonging to formulas (I), (II) or (III) are as described in Patent Cooperation Treaty Publication Nos. WO 98/22486, WO 99/58539, WO 99/24446, WO 96/22995, WO 01/47939, WO 01/44318, and WO-A-91/04257; Patent Cooperation Treaty Application No. PCT/EP02/13552; European Patent Nos. EP-485822, EP-485820, EP 1858907, and EP 1692144; European Patent Application Publication Nos. EP-A-0 129 368, EP-A-0 485 823, EP-A-0 416 815, EP-A-0 420 436, EP-A-0 671404, and EP-A-0 643 066; and U.S. Pat. Nos. 5,556,928, 5,324,800, and 5,145,819.

Chromocene compounds are organometallic coordination compound consisting of a metal bonded to one or two cyclopentadienyl rings. In some embodiments, the cyclopentadienyl rings are substituted. When two cyclopentadienyl rings are present, the chromocene compounds are similar to the metallocene compounds of formula (i) and (II) wherein P is equal to 0, that is, X is not present.

In some embodiments, one cyclopentadienyl ring is present and the chromocene compounds have the formula (IV)

wherein:
Cp-$Z_k$-A is

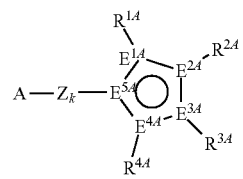

wherein
$E^{1A}$-$E^{5A}$ are each carbon or not more than one $E^{1A}$ to $E^{5A}$ is phosphorus, $R^{1A}$-$R^{4A}$ are each, independently of one another, selected from the group consisting of hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, $NR^{5A}_2$, $N(SiR^{5A}_3)_2$, $OR^{5A}$, $OSiR^{5A}_3$, $SiR^{5A}_3$, $BR^{5A}_2$. In some embodiments, the organic radicals $R^{1A}$-$R^{4A}$ are substituted by halogens. In some embodiments, two vicinal radicals $R^{1A}$-$R^{4A}$ are joined to form a five-, six- or seven-membered carbocyclic ring. In some embodiments, two vicinal radicals $R^{1A}$-$R^{4A}$ are joined to form a five-, six- or seven-membered heterocycle which contains at least one atom from the group consisting of N, P, O or S. In some embodiments, the carbocycle or heterocycle form a condensed aromatic system with the cyclopentadienyl moiety. In some embodiments, the carbocycle or heterocycle is further substituted with hydrogen or, independently, radicals $R^{5A}$.

In some embodiments, at least one $R^{1A}$-$R^{4A}$ is an arylalkyl having from 1 to 10 carbon atoms in the alkyl radical and 6-20 carbon atoms in the aryl radical. In some embodiments, the aryl is substituted by N-, P-, O- or S-containing substituents, $C_1$-$C_{22}$-alkyl, $C_2$-$C_{22}$-alkenyl, halogens or haloalkyls or haloaryls having 1-10 carbon atoms. In some embodiments, the arylalkyl is unfused or non-joined.

the radicals $R^{5A}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical. In some embodiments, two geminal radicals $R^{5A}$ are joined to form a five- or six-membered ring.

In some embodiments, the bridge Z between the cyclopentadienyl system Cp and the uncharged donor A is an organic divalent bridge (k=1), alternatively consisting of carbon- and/or silicon- and/or boron-containing bridge members. It is believed that changing the length of the link between the cyclopentadienyl system and A enables the activity of the catalyst to be influenced.

A is an uncharged donor containing an atom of group 15 or 16 of the Periodic Table or a carbene, alternatively one or more atoms selected from the group consisting of oxygen, sulfur, nitrogen and phosphorus, alternatively nitrogen and phosphorus. In some embodiments, the donor function in A is bound intermolecularly or intramolecularly to the chromium. In some embodiments, the donor in A is bound intramolecularly to chromium. In some embodiments, donors are uncharged functional groups containing an element of group 15 or 16 of the Periodic Table, for example, amine, imine, carboxamide, carboxylic ester, ketone (oxo), ether, thioketone, phosphine, phosphite, phosphine oxide, sulfonyl, sulfonamide, carbenes such as N-substituted imidazol-2-ylidene or unsubstituted, substituted or fused, heterocyclic ring systems. In some embodiments, the synthesis of the bond from A to the cyclopentadienyl radical and Z is carried out by a method analogous to that described in Patent Cooperation Treaty Publication No. WO 00/35928.

In some embodiments, A is a heteroaromatic system, alternatively an unsubstituted, substituted and/or fused six-membered heteroaromatic having 1, 2, 3, 4 or 5 nitrogen atoms in the heteroaromatic part, alternatively substituted and unsubstituted 2-pyridyl, 2-quinolyl or 8-quinolyl.

In some embodiments, the cyclopentadienyl systems Cp have $E^{1A}$ to $E^{5A}$ as carbon.

One of the substituents $R^{1A}$-$R^{4A}$ is an alkylaryl having from 1 to 10 carbon atoms in the alkyl radical and 6-20 carbon atoms in the aryl radical. In some embodiments, the remaining substituents vary widely. In some embodiments, carboorganic substituents $R^{1A}$-$R^{4A}$ are $C_1$-$C_{22}$-alkyl or $C_2$-$C_{22}$-alkenyl. In some embodiments, the $C_1$-$C_{22}$-alkyl is linear or branched. In some embodiments, the $C_1$-$C_{22}$-alkyl is selected from the group consisting of methyl, ethyl, n-propyl, isopropyl, n-butyl, isobutyl, tert-butyl, n-pentyl, n-hexyl, n-heptyl, n-octyl, n-nonyl, n-decyl or n-dodecyl, and 5- to 7-membered cycloalkyl. In some embodiments, the 5- to 7-membered cycloalkyl bear a $C_1$-$C_{10}$-alkyl group or a $C_6$-$C_{10}$-aryl group as substituent. In some embodiments, the cycloalkyl is selected from the group consisting of cyclopropane, cyclobutane cyclopentane, cyclohexane, cycloheptane, cyclooctane, cyclononane and cyclododecane. In some embodiments, the $C_2$-$C_{22}$-alkenyl is linear, cyclic or branched. In some embodiments, the double bond is internal or terminal. In some embodiments, the $C_2$-$C_{22}$-alkenyl is selected from the group consisting of vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl, or arylalkyl. In some embodiments, $C_6$-$C_{22}$-aryl is substituted by further alkyl groups. In some embodiments, $C_6$-$C_{22}$-aryl is selected from the group consisting of phenyl, naphthyl, biphenyl, anthranyl, o-, m-, p-methylphenyl, 2,3-, 2,4-, 2,5-, or 2,6-dimethylphenyl, and 2,3,4-, 2,3,5-, 2,3,6-, 2,4,5-, 2,4,6- or 3,4,5-trimethylphenyl. In some embodiments, arylalkyl is substituted by further alkyl groups. In some embodiments, arylalkyl is selected from the group consisting of benzyl, o-, m-, p-methylbenzyl, and 1- or 2-ethylphenyl. In some embodiments, two of the radicals $R^{1A}$ to $R^{4A}$ are joined to form a 5-, 6- or 7-membered ring. In some embodiments, two of the vicinal radicals $R^{1A}$-$R^{4A}$ are joined to form a five-, six- or seven-membered heterocycle which contains at least one atom from the group consisting of N, P, O or S. In some embodiments, the organic radicals $R^{1A}$-$R^{4A}$ are substituted by halogens such as fluorine, chlorine or bromine.

In some embodiments, $R^{1A}$-$R^{4A}$ are amino $NR^{5A}_2$, or $N(SiR^{5A}_3)_2$, alkoxy or aryloxy $OR^{5A}$. In some embodiments, $R^{1A}$-$R^{4A}$ are selected from the group consisting of dimethylamino, N-pyrrolidinyl, picolinyl, methoxy, ethoxy and isopropoxy. In some embodiments and in organosilicon substituents $SiR^{5A}_3$, the radicals $R^{5A}$ is the same carboorganic radicals as for $R^{1A}$-$R^{4A}$. In some embodiments, two $R^{5A}$ are joined to form a 5- or 6-membered ring. In some embodiments, the 5- or 6-membered ring is selected from the group consisting of trimethylsilyl, triethylsilyl, butyldimethylsilyl, tributylsilyl, tri-tert-butylsilyl, triallylsilyl, triphenylsilyl and dimethylphenylsilyl.

In some embodiments, $SiR^{5A}_3$ radicals are bound to the cyclopentadienyl skeleton via an oxygen or nitrogen. In some embodiments, $SiR^{5A}_3$ radicals are selected from the group consisting of trimethylsilyloxy, triethylsilyloxy, butyldimethylsilyloxy, tributylsilyloxy and tri-tert-butylsilyloxy. In some embodiments, radicals $R^{1A}$-$R^{4A}$ are selected from the group consisting of hydrogen, methyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. In some embodiments, organosilicon substituents are trialkylsilyl groups having from 1 to 10 carbon atoms in the alkyl radical, alternatively trimethylsilyl groups.

In some embodiments, atoms $E^{1A}$-$E^{5A}$ bear two vicinal radicals $R^{1A}$-$R^{4A}$ and the vicinal radicals $R^{1A}$-$R^{4A}$ form a heterocycle which contains at least one atom from the group consisting of nitrogen, phosphorus, oxygen and sulfur, alternatively nitrogen or sulfur. In some embodiments, the atoms $E^{1A}$-$E^{5A}$ in the heterocycle are carbon. In some embodiments, the heterocycle is a heteroaromatic.

In some embodiments, the heterocycles and heteroaromatics have a ring size of 5 or 6 ring atoms. In some embodiments, the 5-membered heterocycles, having from one to four nitrogen atoms or a sulfur or oxygen atom in addition to carbon atoms as ring members are selected from the group consisting of 1,2-dihydrofuran, furan, thiophene, pyrrole, isoxazole, 3-isothiazole, pyrazole, oxazole, thiazole, imidazole, 1,2,4-oxadiazole, 1,2,5-oxadiazole, 1,3,4-oxadiazole, 1,2,3-triazole and 1,2,4-triazole. In some embodiments, the 6-membered heteroaryl groups contain from one to four nitrogen atoms or a phosphorus atom and are selected from the group consisting of pyridine, phosphobenzene, pyridazine, pyrimidine, pyrazine, 1,3,5-triazine, 1,2,4-triazine and 1,2,3-triazine.

In some embodiments, the 5-membered and 6-membered heterocycles are substituted by $C_1$-$C_{10}$-alkyl, $C_6$-$C_{10}$-aryl, alkylaryl having from 1 to 10 carbon atoms in the alkyl radical and 6-10 carbon atoms in the aryl radical, trialkylsilyl or halogens such as fluorine, chlorine or bromine, dialkylamide, alkylarylamide, diarylamide, alkoxy or aryloxy. In some embodiments, the 5-membered and 6-membered heterocycles are fused with one or more aromatics or heteroaromatics. In some embodiments, the 5-membered heterocycles are benzo-fused 5-membered heteroaryl groups selected from the group consisting of indole, indazole, benzofuran, benzothiophene, benzothiazole, benzoxazole and benzimidazole. In some embodiments, the 6-membered heterocycles are benzo-fused 6-membered heteroaryl groups selected from the group consisting of chromane, benzopyran, quinoline, isoquinoline, cinnoline, phthalazine, quinazoline, quinoxaline, 1,10-phenanthroline and quinolizine.

Naming and numbering of the heterocycles has been taken from Lettau, Chemie der Heterocyclen, 1$^{st}$ edition, VEB, Weinheim 1979. In some embodiments, the heterocycles/heteroaromatics are fused with the cyclopentadienyl skeleton via a C—C double bond of the heterocycle/heteroaromatic. In some embodiments, the heterocycles/heteroaromatics having one heteroatom are 2,3- or b-fused.

In some embodiments, the cyclopentadienyl systems Cp having a fused heterocycle are selected from the group consisting of thiapentalene, methylthiapentalene, ethylthiapentalene, isopropylthiapentalene, n-butylthiapentalene, tert-butylthiapentalene, trimethylsilylthiapentalene, phenylthiapentalene, napthylthiapentalene, methylthiopentalene, azapentalene, methylazapentalene, ethylazapentalene, isopropylazapentalene, n-butylazapentalene, trimethylsilylazapentalene, phenylazapentalene, naphthylazapentalene, oxapentalene and phosphapentalene.

In some embodiments, the synthesis of the cyclopentadienyl systems having a fused-on heterocycle is as described in Patent Cooperation Treaty Publication No. WO 98/22486. In some embodiments, the synthesis of cyclopentadienyl systems are as described in "metalorganic catalysts for synthesis and polymerisation", Springer Verlag 1999, Ewen et al., p. 150 ff.

In some embodiments, substituents $R^{1A}$-$R^{4A}$ are carboorganic substituents. In some embodiments, the carboorganic substituents form a cyclic fused ring system with the $E^{1A}$-$E^{5A}$ skeleton. In some embodiments, the carboorganic substituents form a cyclic fused ring system with a cyclopentadienyl skeleton. In some embodiments, the cyclic fused ring system is selected from the group consisting of an unsubstituted or substituted indenyl, indacenyl, benzindenyl, phenanthrenyl and tetrahydroindenyl system.

In some embodiments, the cyclopentadienyl systems (without the group —Z-A- and without the arylalkyl substituents) are selected from the group consisting of monoalkylcyclopentadienyl systems, dialkylcyclopentadienyl systems, trialkylcyclopentadienyl systems, indenyl, indacenyl, and benzoindenyl. In some embodiments, the absent group —Z-A-would have been located in the 1 position. In some embodiments, the monoalkylcyclopentadienyl systems are selected from the group consisting of 3-methylcyclopentadienyl, 3-ethylcyclopentadienyl, 3-isopropylcyclopentadienyl, and 3-tert-butylcyclopentadienyl. In some embodiments, the dialkylcyclopentadienyl systems are selected from the group consisting of tetrahydroindenyl, 2,4-dimethylcyclopentadienyl, and 3-methyl-5-tert-butylcyclopentadienyl. In some embodiments, the trialkylcyclopentadienyl systems is 2,3,5-trimethylcyclopentadienyl.

In some embodiments, the fused ring system bears further $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, $NR^{5A}{}_2$, $N(SiR^{5A}{}_3)_2$, $OR^{5A}$, $OSiR^{5A}{}_3$ or $SiR^{5A}{}_3$ substituents. In some embodiments, the fused ring system is selected from the group consisting of 4-methylindenyl, 4-ethylindenyl, 4-isopropylindenyl, 5-methylindenyl, 4-phenylindenyl, 5-methyl-4-phenylindenyl, and 4-naphthylindenyl.

In some embodiments, the cocatalyst used as component c) in the catalyst system is alumoxane. In some embodiments, the alumoxane is obtained by reacting water with an organo-aluminum compound of formula $H_jAlU_{3-j}$ or $H_jAl_2U_{6-j}$, where the U substituents, same or different, are hydrogen atoms, halogen atoms, $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In some embodiments and in this reaction, the molar ratio of Al/water is between 1:1 and 100:1.

In some embodiments, the alumoxanes are linear, branched or cyclic compounds containing at least one group of the type:

wherein the substituents U, same or different, are as previously herein described.

In some embodiments, alumoxanes of the formula:

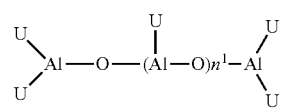

are used as linear compounds, wherein $n^1$ is 0 or an integer of from 1 to 40 and the substituents U are as previously herein described. In some embodiments, the alumoxanes of the formula:

are used as cyclic compounds, wherein $n^2$ is an integer from 2 to 40 and the U substituents are as previously herein described.

In some embodiments, the alumoxanes are selected from the group consisting of methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl) alumoxane (TTMBAO).

In some embodiments, the cocatalysts are as described in Patent Cooperation Treaty Publication Nos. WO 99/21899 and in WO01/21674, wherein the alkyl and aryl groups have specific branched patterns.

In some embodiments, aluminum compounds are reacted with water to give alumoxanes (b) as described in Patent Cooperation Treaty Publication Nos. WO 99/21899 and WO01/21674. In some embodiments, the aluminum compounds are selected from the group consisting of tris(2,3,3-trimethyl-butyl)aluminum, tris(2,3-dimethyl-hexyl) aluminum, tris(2,3-dimethyl-butyl) aluminum, tris(2,3-dimethyl-pentyl) aluminum, tris(2,3-dimethyl-heptyl) aluminum, tris(2-methyl-3-ethyl-pentyl) aluminum, tris(2-methyl-3-ethyl-hexyl) aluminum, tris(2-methyl-3-ethyl-heptyl) aluminum, tris(2-methyl-3-propyl-hexyl) aluminum, tris(2-ethyl-3-methyl-butyl) aluminum, tris(2-ethyl-3-methyl-pentyl) aluminum, tris(2,3-diethyl-pentyl) aluminum, tris(2-propyl-3-methyl-butyl) aluminum, tris(2-isopropyl-3-methyl-butyl) aluminum, tris(2-isobutyl-3-methyl-pentyl) aluminum, tris(2,3,3-trimethyl-pentyl) aluminum, tris(2,3,3-trimethyl-hexyl) aluminum, tris(2-ethyl-3,3-dimethyl-butyl) aluminum, tris(2-ethyl-3,3-dimethyl-pentyl) aluminum, tris(2-isopropyl-3,3-dimethyl-butyl) aluminum, tris(2-trimethylsilyl-propyl) aluminum, tris(2-methyl-3-phenyl-butyl) aluminum, tris(2-ethyl-3-phenyl-butyl) aluminum, tris(2,3-dimethyl-3-phenyl-butyl) aluminum, tris(2-phenyl-propyl) aluminum, tris[2-(4-fluoro-phenyl)-propyl] aluminum, tris[2-(4-chloro-phenyl)-propyl] aluminum, tris[2-(3-isopropyl-phenyl)-propyl] aluminum, tris(2-phenyl-butyl) aluminum, tris(3-methyl-2-phenyl-butyl) aluminum, tris(2-phenyl-pentyl) aluminum, tris[2-(pentafluorophenyl)-propyl] aluminum, tris[2,2-diphenyl-ethyl] aluminum and tris[2-phenyl-2-methyl-propyl] aluminum, the corresponding compounds wherein one of the hydrocarbyl groups is replaced with a hydrogen atom, and the corresponding compounds wherein one or two of the hydrocarbyl groups are replaced with an isobutyl group.

In some embodiments, the aluminum compounds are selected from the group consisting of trimethylaluminum (TMA), triisobutylaluminum (TIBA), tris(2,4,4-trimethyl-pentyl) aluminum (TIOA), tris(2,3-dimethylbutyl)aluminum (TDMBA) and tris(2,3,3-trimethylbutyl)aluminum (TTMBA).

In some embodiments, the cocatalyst component C) forms an alkylmetallocene cation. In some embodiments, the cocatalyst component C is a compound of formula $D^+E^-$, wherein $D^+$ is a Brønsted acid, able to donate a proton and react irreversibly with a substituent X of the metallocene of formula (I), and $E^-$ is a compatible anion, which is able to stabilize the active catalytic species originating from the reaction of the two compounds and labile for removable by an olefinic monomer. In some embodiments, the anion $E^-$ is made from or contains one or more boron atoms. In some embodiments, the anion $E^-$ is an anion of the formula $BAr_4^{(-)}$ wherein the substituents Ar are aryl radicals. In some embodiments, the substituents Ar are identical or different. In some embodiments, the substituents Ar are selected from the group consisting of phenyl, pentafluorophenyl and bis(trifluoromethyl)phenyl. In some embodiments, the cocatalyst component C) is tetrakis-pentafluorophenyl borate, as described in Patent Cooperation Treaty Publication No. WO 91/02012.

In some embodiments, the compounds have formula $BAr_3$. In some embodiments, compounds having the formula $BAr_3$ are as described in Patent Cooperation Treaty Publication No. WO 92/00333. In some embodiments, the compounds, which can form an alkylmetallocene cation, are compounds of formula $BAr_3P$ wherein P is a substituted or unsubstituted pyrrol radical.

In some embodiments, the compounds are as described in Patent Cooperation Treaty Publication No. WO01/62764. In some embodiments, compounds containing boron atoms are supported as described in German Patent Application Nos. DE-A-19962814 and DE-A-19962910. In some embodiments, these compounds containing boron atoms are used in a molar ratio between boron and the metal of the metallocene or chromocene between 1:1 and 10:1; alternatively 1:1 and 2:1; alternatively 1:1.

In some embodiments, the supported catalyst system is obtained by contacting components A), B), and C) in any order. In some embodiments, the process is to contact component A) with component C) and then to add component B).

In some embodiments, the present disclosure provides a process for polymerizing alpha olefins including the step of contacting, under polymerization conditions, alpha olefins and the supported catalyst system.

In some embodiments, the supported catalyst system is for the polymerization of olefins, alternatively polymerization of alpha olefins in high yields. In some embodiments, the supported catalyst system is used for the polymerization of ethylene or for the copolymerization of ethylene with one or more alpha-olefins of formula $CH_2=CHT$ wherein T is a $C_1$-$C_{10}$ alkyl radical. In some embodiments, alpha-olefins of formula $CH_2=CHT$ are selected from the group consisting of propylene, 1-butene, 1-hexene, 1-octene and 4-methyl-1-pentene, alternatively propylene, 1-butene, 1-hexene and 1-octene.

The following examples are given to illustrate and not to limit the present disclosure.

EXAMPLES

Component B1)
Synthesis of Gibbsite Nano Platelet

Gibbsite nano platelet (γ-Al(OH)$_3$) is synthesized from Al(NO$_3$)$_3$.9H$_2$O as precursor after hydrothermal crystallization. The preparation procedure is described in Schema 1.

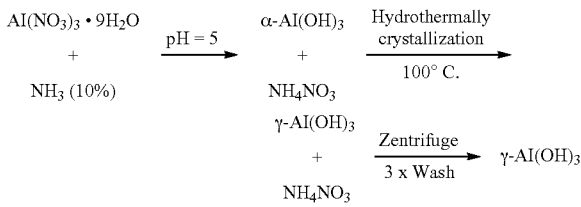

In some embodiments, 96.23 g Al(NO$_3$)$_3$.9H$_2$O is dissolved in 1923 g deionized water. Then, dropwise ammonia in a solution at 10 wt.-% in water is added to adjust the PH to 5 at room temperature with a vigorous stirring to form a homogenous white gel-like solution. The homogenous white gel-like solution is treated in oven at 100° C. for 10 days. The supernatant liquid is removed. The sedimentation is centrifuged at 7500 rpm for 30 minutes and washed 3 times with deionized water to purify the product. 20 g of wet gibbsite is obtained. The gibbsite was stored in a wet state.

Component B2)
Synthesis of Organophilic Nano Platelet Gibbsite

The wet state gibbsite (about 20 g) was dispersed in 300 ml of a mixture containing 75 ml deionized water and 225 ml of ethanol in a 500 ml two necked flask. The mixture was treated with ultrasonic bath at room temperature for 30 min. Then 5 ml (of a 20 wt.-% solution of trimethoxy (octadecyl) silane was added. The suspension was heated at 75° C. for 12 h with stirring (500 rpm). After 12 h, the suspension was cooled. The supernatant liquid was removed. The sediment was purified by centrifuge with a rate of 7500 rpm for 20 min and washed 2 times with EtOH. The organophilic gibbsite was dried.

Example 1
Component A)
Component A) used was chromocene of formula

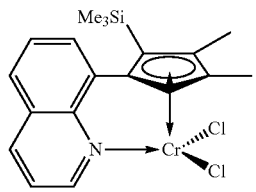

Catalyst System 250 mg of component B2) was dried overnight under vacuum at 100° C. Then component B2) was dispersed in 5 ml toluene using an ultrasonic bath for 30 min. 0.77 ml of methylalumoxane (MAO 30 wt % in toluene) was added and stirred for 5 min. The powder was permitted to settle. The supernatant toluene was removed. The powder was washed twice with toluene with separation by decantation. A solution of 0.5 mg of the chromium complex component A) in toluene was added to the support. The suspension was stirred for 5 min and decanted. The supernatant liquid was removed. The power was suspended in 20 ml of heptane.

Ethylene Polymerization

The catalyst system was added to a polymerization reactor containing 580 ml heptane and 3 ml of 1 molar tri-isobutyl aluminum in heptane. Ethylene (5 bar) was added at 40° C. under stirring. Polymerization proceeded at a pressure of 5 bar for 2 hours. Then the reactor was depressurized. Methanol was added. The recovered polymer was filtered and dried overnight. The activity of the catalyst system was 160 000 kgpol/molCr/h.

Comparative Example 2

The catalyst system was prepared as previously described with the difference being that gibbsite nano platelet component B1 was used instead of organophilic nano platelet gibbsite component B2. The polymerization was carried out according to the previously-described procedure. The activity of the catalyst system was 40 000 kgpol/molCr/h.

Component A1)
2-((1-(trimethylsilyl)-indenyl)-methyl)pyridin-CrCl2 (as described in Patent Cooperation Treaty Publication No. WO 2011/089017).

Component A2)
Bis(n-butyl-cyclopentadienyl)hafnium dichloride, commercially available from Chemtura Inc.

Comparative Example 3
Catalyst System 3

250 mg of component B1) was dried overnight under vacuum at 100° C. Then component B1) was dispersed in 20 ml toluene using an ultrasonic bath for 30 min. 0.85 ml of methylalumoxane (MAO 30 wt % in toluene, commercially available from Chemtura Inc) was added and stirred for 30 min. The powder was permitted to settle. The supernatant toluene was removed. The powder was washed twice with 20 ml toluene and then twice with 20 ml of heptane with separation by decantation. A solution of 4.3 mg Component A1) and 3.5 mg of the chromium complex component A2) in 2 ml toluene was added to the support. The suspension was stirred for one hour. The supernatant liquid was decanted. The powder was resuspended in 20 ml of heptane, thereby yielding a 20 ml solution with ~70 μmol/g active components.

Example 4
Catalyst System 4

250 mg of component B2) was dried overnight under vacuum at 100° C. Then component B2) was dispersed in 20 ml toluene using an ultrasonic bath for 30 min. 0.85 ml of methylalumoxane (MAO 30 wt % in toluene, commercially available from Chemtura Inc) was added and stirred for 30 min. The powder was permitted to settle. The supernatant toluene was removed. The powder was washed twice with 20 ml toluene and then twice with 20 ml of heptane with separation by decantation. A solution of 4.4 mg Component A1) and 3.4 mg of the chromium complex component A2) in 2 ml toluene was added to the support. The suspension was stirred for one hour. The supernatant liquid was decanted. The powder was resuspended in 20 ml of heptane, thereby yielding a 20 ml solution with ~70 μmol/g active components.

Comparative Example 5
Catalyst System 5

Catalyst system 4 was repeated with silica support Sylopol XPO2326, commercially available from Grace, instead of component B2).

Polymerization 400 ml isobutane were loaded in an autoclave under nitrogen. The reactor was flashed twice by 2 bar ethylene to remove the nitrogen. The reactor was pressurized to 30 Bar with ethylene. 1 ml (corresponding to 12.5 mg of support) was added to the reactor through a feeding valve. The reaction was carried out under stirring for one hour at 65° C. The results are summarized in Table 1.

TABLE 1

| Catalyst System | Catalyst system [mg] | Mileage [gPE/g support] | density (I.R.) [g/cm$^3$] |
| --- | --- | --- | --- |
| 3 | 12.5 | 6500 | 0.9233 |
| 4 | 12.5 | 10000 | 0.9256 |
| 5 | 12.5 | 3500 | 0.9320 |

What is claimed is:

1. A supported catalyst system comprising:
   A) at least one organometallic coordination compound consisting of a metal bonded to one or two cyclopentadienyl rings;
   B) a nano platelet gibbsite treated with compound of formula $(OR^a)_3Si—R^b$ or of formula $R^c—COOH$ wherein $R^a$ equal to or different from each other is a $C_1$-$C_{10}$ alkyl radical; $R^b$ is a $C_5$-$C_{30}$ hydrocarbon radical and $R^c$ is a $C_5$-$C_{30}$ hydrocarbon radical; and
   C) a cocatalyst.

2. The supported catalyst system according to claim 1, wherein the nano platelet gibbsite is treated with compound of formula $(OR^a)_3Si—R^b$ and $R^a$ is a $C_1$-$C_8$ alkyl radical.

3. The supported catalyst system according to claim 1, wherein the nano platelet gibbsite is treated with compound of formula $(OR^a)_3Si-R^b$ and $R^a$ is a $C_1$-$C_4$ alkyl radical.

4. The supported catalyst system according to claim 1, wherein the nano platelet gibbsite is treated with compound of formula $(OR^a)_3Si-R^b$ and $R^b$ is a linear or branched $C_5$-$C_{30}$, alkyl, alkenyl, or alkynyl radical.

5. The supported catalyst system according to claim 1, wherein the nano platelet gibbsite is treated with compound of formula $(OR^a)_3Si-R^b$ and $R^b$ is a $C_{10}$-$C_{20}$ linear or branched $C_5$-$C_{30}$, alkyl, alkenyl, or alkynyl radical.

6. The supported catalyst system according to claim 1, wherein the nano platelet gibbsite is treated with compound of formula $(OR^a)_3Si-R^b$ and $R^b$ is a $C_{10}$-$C_{20}$ linear alkyl, alkenyl, or alkynyl radical.

7. The supported catalyst system according to claim 1, wherein the nano platelet gibbsite is treated with compound of formula $(OR^a)_3Si-R^b$ with the compound being trimethoxy (octadecyl) silane.

8. The supported catalyst system according to claim 1, wherein the nano platelet gibbsite is treated with compound of formula $R^c-COOH$ and $R^c$ is a linear or branched $C_5$-$C_{30}$, alkyl, alkenyl, or alkynyl radical.

9. The supported catalyst system according to claim 1, wherein the nano platelet gibbsite is treated with compound of formula $R^c-COOH$ and $R^c$ is a $C_{10}$-$C_{20}$ linear alkyl, alkenyl, or alkynyl radical.

10. The supported catalyst system according to claim 9, wherein the compound of formula $R^c-COOH$ is a fatty acid.

11. The supported catalyst system according to claim 1, wherein component A) is a chromocene compound.

12. The supported catalyst system according to claim 1, wherein component A) is a mixture of a chromocene compound and a metallocene compound.

13. The supported catalyst system according to claim 1, wherein component C is an alumoxane.

14. The process for polymerizing alpha olefins comprising the step of:

contacting under polymerization conditions alpha olefins and the supported catalyst system of claim 1.

* * * * *